Figure 1:
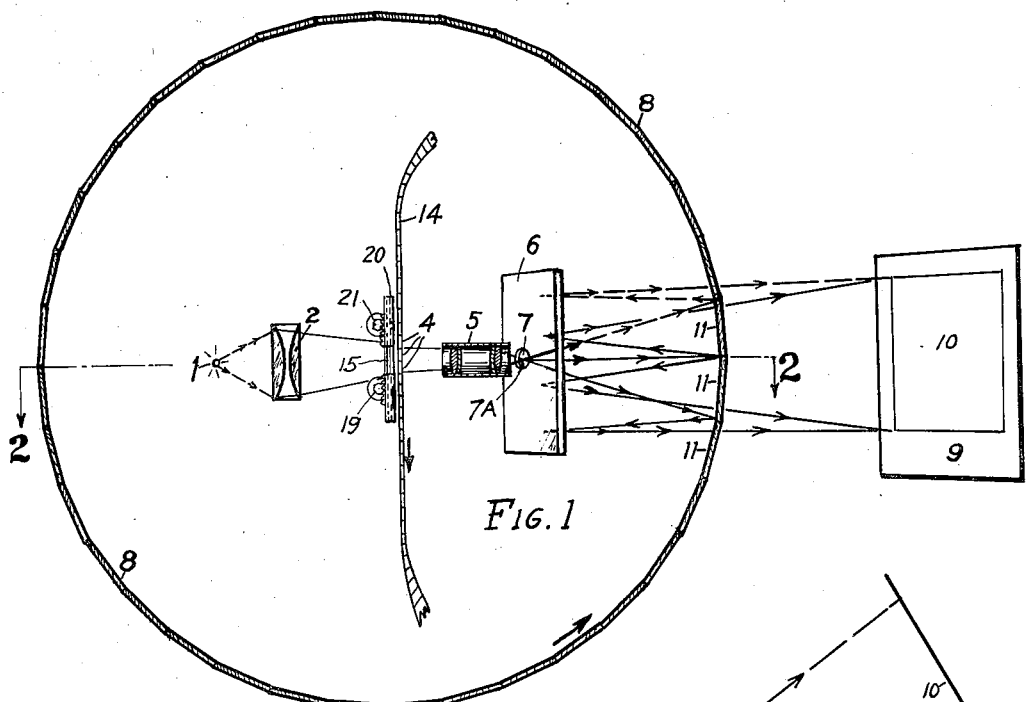

March 2, 1926.  
I. N. STEIGMAN  
MOTION PICTURE MACHINE  
Filed May 3, 1923

1,575,133

WITNESS
William J. Helfgott

INVENTOR
Israel N. Steigman
By Harry Jacobson
ATTORNEY

Patented Mar. 2, 1926.

1,575,133

UNITED STATES PATENT OFFICE.

ISRAEL N. STEIGMAN, OF NEW YORK, N. Y.

MOTION-PICTURE MACHINE.

Application filed May 3, 1923. Serial No. 636,309.

*To all whom it may concern:*

Be it known that I, ISRAEL N. STEIGMAN, a citizen of the United States, and resident of the city of New York, in the county of New York and State of New York, have invented certain new and useful Improvements in Motion-Picture Machines, of which the following is a specification.

This invention relates to motion picture apparatus, and particularly to that type in which each of a series of projected pictures is maintained upon a screen until the next succeeding picture replaces it or is superimposed thereon, without intervals of darkness between successive pictures.

In mechanism of this character, a revoluble ring of internally reflecting reflectors is employed for reflecting the picture as a whole to a constant predetermined position on the screen. Previous arrangements of the above described types of projecting apparatus however, have not been designed nor are they adapted to reflect a beam of light along a theoretically correct path, it being understood that it is only by reflection along such a path that maximum definition of the picture on the screen is obtainable. It has not been possible, owing to the subsequent obstruction of the reflected rays by the apparatus itself in such arrangements, to reflect rays of light passing through the film along a path which may be described as in a line passing through and perpendicular both to the axis of rotation of said ring and to the surface of one of the reflectors of said ring, when said reflector is in operative position. Said arrangements have the defect of uneven focusing and have therefore resulted in poor definition of the image on the screen, especially at the edges.

It is one of the objects of this invention to provide a projecting apparatus, the component parts of which are positioned in such optical relation, that a clear, well-defined, stationary picture on the screen results, when light is passed through the pictures of a continuously moving film.

A further object of this invention is the provision, in a motion picture machine, of means for projecting and reflecting beams of light along theoretically correct paths, while at the same time allowing the diversion of the beams out of the machine.

A further object of this invention is the provision of means for diverting an incident ray which has been reflected back on itself, to one side, without materially interfering with either the incident or reflected ray.

A further object of this invention is the provision of means for compensating for the loss of reflecting surface incident to my improved arrangement.

A still further object of this invention is the provision of means for controlling the number of film pictures which may be simultaneously projected.

Figure 2:
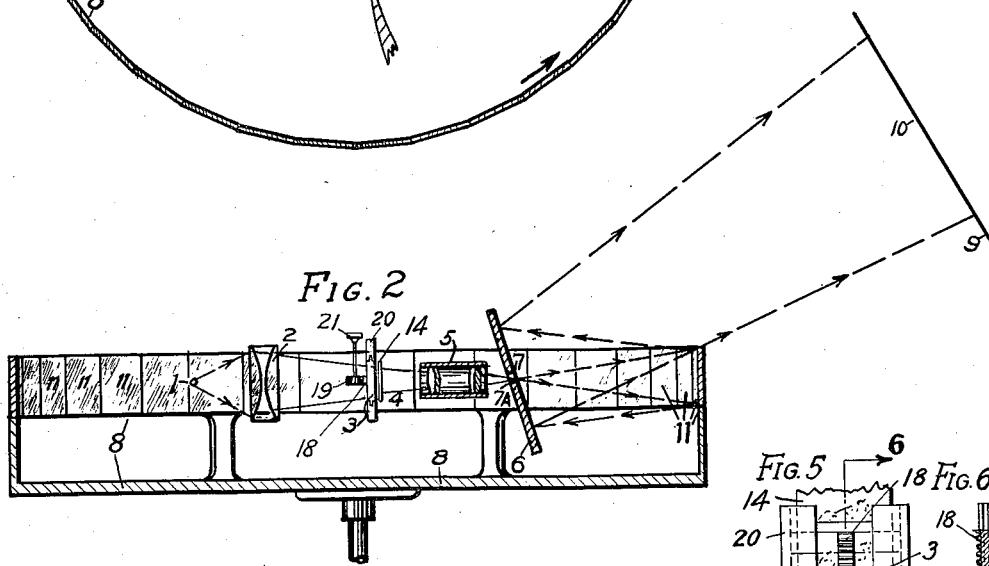
Figure 3:
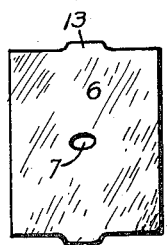
Figure 4:
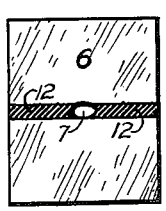
Figures 5, 6:
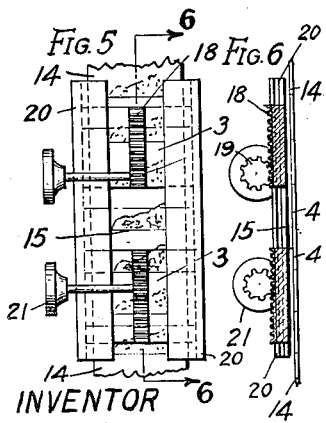

For the attainment of the aforesaid and other objects which will appear as the description progresses, I employ the arrangements and combinations of parts shown in their preferred forms in the accompanying drawings, in which, Figure 1 is a front elevation and partial vertical section of my improved apparatus. Fig. 2 is a horizontal axial section of the same on the line 2—2 of Fig. 1. Fig. 3 is a front view of the diverting reflector showing means for compensating for the loss of reflecting surface due to the aperture therein. Fig. 4 is a similar view of the same showing a modified form of compensating means. Fig. 5 is a side view of the adjustable gate through which the light is passed before reaching the film. Fig. 6 is a vertical section thereof on the line 6—6 of Fig. 5.

In the practical embodiment of my invention, light from a suitable source as 1, is collected by a condenser as 2, which directs the beam of light upon the picture film 14, of the usual type used in motion picture machines, in which a series of pictures 4 are consecutively arranged. A pair of gates 3 is adjustably mounted in juxtaposition to the film, on the lighted side thereof. Said gates have an opening 15 therebetween, one dimension of which may be varied by moving said gates closer together or further apart. Suitable means, which will be described more fully hereinafter, are provided for this purpose. By varying the size of said opening 15, it becomes possible, in conjunction with the remainder of my apparatus soon to be described, to project any length of film desired at any given time, whereby the intensity of the illumination of the screen image may be varied, part or all of two or more pictures simultaneously superimposed upon each other to give smoothness of action in the display on the screen, suitable stereoscopic, color or sound reproducing effects, or any combinations of the above mentioned effects, produced, if desired.

Part of the apparatus for projecting the pictures in superimposed relation on the screen consists of the hereinbefore mentioned rotatable ring 8, formed of a series of internally reflecting mirrors or other suitable reflectors 11, each preferably disposed with the plane of the reflecting surface thereof parallel to the axis of rotation of said ring, and each preferably forming one side of a regular polygonal prism. Said prism will hereinafter be referred to as the ring. It will be understood that a section of said ring 8 by a plane perpendicular to the axis of said ring, though actually a many sided polygon, is substantially circular, and will hereinafter be referred to as a circular section of said ring.

It is well known that if a source of light is placed substantially midway between a substantially cylindrical internally reflecting surface and the axis of said surface, beams of light emanating from said source are reflected by said surface substantially parallel to each other. If the incident beam of light reaching said polygonal reflecting surface is arranged with the axis thereof along a radius of a circular section of said ring, the beam is reflected by said surface with the axis of said beam substantially coincident with the axis of said incident beam.

I utilize this principle in my improved apparatus by focusing the light passing through the film 14 at a point on the radius of a circular section of said ring 8. Said radius may otherwise be described as a line passing through and perpendicular to the axis of said ring. To accomplish said focusing, an objective 5 collects the light passing through the film and forming one or more pictures or parts of pictures, and concentrates said beam at a focal point 7ª outside of said objective, and between said objective and the nearest of the mirrors 11 to said objective, the axis of said objective being preferably coincident with a radius of said circular section. It will be seen therefore, that the axis of the beam of light passing through the film, the objective, and the focal point and impinging on any of the mirrors 11, is substantially coincident with the axis of the beam reflected by said mirrors 11 back toward said focal point.

To prevent obstruction of said reflected beam by said objective and said film, and to divert said reflected beam out of the apparatus and upon a predetermined area 10 of the screen 9, I provide the preferably vertical diverting reflector 6, arranged at a suitable angle with the axis of the reflected beam of light. An aperture 7, of just sufficient diameter to allow the beam constricted by the objective 5 to pass therethrough without obstruction, is substantially centrally located in said mirror or reflector 6, and is positioned as nearly as practicable with the center thereof coincident with the focal point 7ª.

While the axis of the beam focused by the objective 5 and that of the beam reflected by the mirrors 11 are substantially coincident, it will be understood from the diagram in Fig. 1 indicating the path of the rays, that the constricted beam after passing through the aperture 7 diverges until said beam impinges on the mirrors 11. Said mirrors are so proportioned that a single complete picture is subtended and reflected by the operative one of the ring of mirrors, at any given time, and a portion of a picture is reflected by a corresponding portion of an operative mirror. If the gate opening 15 is large enough to admit two pictures, two of the mirrors 11 are operative at one time, and if three pictures are positioned in said opening, a corresponding number of mirrors 11 will be operative at any given time, regardless of whether whole pictures or parts of pictures are located in the opening 15.

The film 14 is preferably advanced continuously in the direction of the arrow adjacent thereto, (Fig. 1) while the ring 8 is rotated in the direction of the arrow adjacent thereto in synchronism with the movement of the film, as is usual in apparatus of this type.

It being assumed that only one of the pictures 4 is exposed in the gate opening 15 to the light 1, it will be understood that in any given position of the film 14 and of the ring 8, the opening 7 in the diverting reflector 6 appears on the screen as a dark circular area near the center of the picture. On slow movement of the film and correspondingly slow movement of the ring 8, said area travels upwardly across the screen. At the high speed of film used in practical projection, the result of the loss of reflecting surface due to the opening 7 would be an upright band somewhat darker in appearance than the remainder of the picture, extending from the top to the bottom of said picture. It will be seen, however, that if two or more pictures are exposed in the gate simultaneously, the consequent projection of the several pictures by the corresponding mirrors 11 to the same area of the screen results in the overlapping of the pictures, and causes at least one picture to appear in the circular area, even though part of one of the pictures may be lost by being reflected back through the aperture 7. Though said circular area and the band resulting therefrom when the film is in motion appears somewhat darker than the remainder of the picture, the loss of light is practically insignificant owing to the fact that intervals of darkness between the pictures is eliminated.

To avoid the appearance on the screen of the dark band above described, I add a compensating portion as 13 (Fig. 3) to each end of the diverting mirror 6. Each of said portions 13 reflects a small part of the picture adjacent that wholly reflected upon the screen, thereby covering up the dark area with the portion of the picture belonging therein, whereby the illumination in the otherwise darker band is brought up to proper valve.

To prevent the appearance in the middle of the picture of a band darker than the remainder thereof, a band 12 across the entire width of the reflector 6 and as high as the diameter of the aperture 7, may be made non-reflecting. The appearance on the screen of images reflected by a mirror 6 having such a non-reflecting band or zone 12 would be a slight flicker due to alternating bright, and somewhat dimmer pictures, the dimmer pictures being caused by the rapid passage of a dark horizontal band vertically up across the screen. Said dimmer pictures are, however, of comparatively short duration as compared with that of the bright pictures, and the flickering effect is therefore negligible For adjusting the gate opening 15, I provide a pair of movable gates 3, each preferably of sheet material having a rack as 18 thereon meshing with a gear 19. Said gate is suitably supported for slidable movement in the guides 20. A hand nut or wheel 21 is preferably connected to said gear for operating said gear and therethrough said rack.

It will be seen that my improved apparatus projects and reflects the beam of light along theoretically correct paths for causing pictures to succeed or replace each other on the screen smoothly and without, perceptible pause, and produces a clear, well-defined image in which the intensity of the light may be varied as desired; that my improved compensating means minimizes the disadvantage due to the loss of reflecting surface occasioned by the aperture in the diverting reflector, and that the smoothness of action is substantially independent of the speed of the film.

It will be further understood that my apparatus may be used as a camera for the taking of motion pictures, and that it is adapted for combination with any of the color projection, stereoscopic, and photographic sound reproducing and recording devices, or combinations thereof, in a manner which is obvious, without departing from the spirit of my invention.

I claim:

1. In a motion picture machine, a revoluble internally reflecting ring comprising a series of substantially plane reflectors each arranged with the reflecting surface thereof parallel to the axis of revolution of said ring, a film movably arranged inside of said ring, means for passing light through said film, means for focusing the resulting beam of light at a predetermined point between said film and said reflectors and for directing said beam toward said reflectors, and means at said predetermined point for obstructing the beam reflected by said reflectors and for diverting said beam out of said ring.

2. In a motion picture machine, the combination with a revoluble, polygonal internal reflector, of means arranged with the axis thereof perpendicular to and intersecting the axis of said reflector for directing a beam of light toward said reflector, and means arranged between said axis of said reflector and the reflecting surface of said reflector for changing the direction of said beam after reflection by said reflector.

3. In a motion picture machine, the combination with a polygonal ring of internally reflecting mirrors adapted to reflect a beam of light with the axis of said beam passing through and perpendicular to the axis of said ring, of means for directing a beam of light toward said mirrors with the axis of said beam coincident with the axis of the beam reflected by said mirrors, and means for diverting the last-mentioned beam out of said ring after said beam has been reflected by the mirrors of said ring.

4. In a motion picture machine, means for reflecting an incident beam of light with the axis of the reflected beam substantially coincident with the axis of said incident beam, and means for diverting substantially all the light from said reflected beam substantially without interfering with said incident beam.

5. In a motion picture machine, the combination with a ring of internally reflecting mirrors each arranged parallel to the axis of said ring, of means arranged with the axis thereof coincident with a line passing through and perpendicular to the axis of said ring for focusing a beam at a point on said line between the axis of said ring and the operative mirror of said ring, and means for diverting said beam out of said ring after said beam has been reflected by said operative mirror.

6. In a motion picture machine, revoluble means having a reflecting surface for reflecting a moving beam of light toward a predetermined area, means arranged with the axis thereof coincident with a line passing through and perpendicular to the axis of said revoluble means, for focusing said moving beam at a point on said line between the axis of said revoluble means and the reflecting surface thereof, and means arranged across the path of the beam reflected by said reflecting surface and angularly disposed to said line for diverting said beam out of said machine.

7. In a motion picture machine, revoluble internally reflecting means for rendering a moving beam of light stationary and for reflecting said beam, means arranged coaxially of said moving beam for focusing said moving beam at a point between the axis of said revoluble means and the reflecting surface thereof, and an apertured reflector coacting with said revoluble means and arranged angularly with respect to the axis of said beam at said point for diverting the beam reflected by said revoluble means out of the machine.

8. In a motion picture machine, revoluble means for rendering a moving beam of light stationary and for reflecting said beam, an apertured reflector arranged angularly with respect to the axis of said beam at the focal point of said beam for allowing said moving beam to pass therethrough and to divert the reflected beam out of said machine.

9. In a motion picture machine, the combination with a continuously movable film, of a polygonal ring of mirrors revoluble in synchronization with said film, means for projecting a beam of light passing through said film along a line perpendicular to and passing through the axis of said ring for reflection by said ring, and for focusing said beam, and an apertured mirror at the focal point of said beam for permitting the beam projected on said ring to pass therethrough and for diverting the beam reflected by said ring.

10. In a motion picture machine, the combination with a continuously movable film, of means for making a beam of light passing through said film appear clear and stationary comprising a polygonal ring of internal reflecting mirrors revoluble in synchronization with said film, an objective having the axis thereof perpendicular to and passing through the axis of said ring and arranged coaxially of said beam for projecting said beam on to said ring, and means for diverting the beam reflected by said mirrors comprising an apertured mirror allowing the major part of the projected beam to pass therethrough and cooperating with said ring of mirrors.

11. Means for reflecting a beam of light back on itself and means for diverting said beam, comprising an objective for focusing said beam, and an apertured reflector arranged angularly with respect to the axis of said beam and with the aperture of said reflector substantially at the point at which said beam is focused.

12. In a motion picture machine, the combination with a continuously movable film, of a polygonal ring of internally reflecting mirrors revoluble in synchronism with said film, an objective disposed with the axis thereof on a line perpendicular to and passing through the axis of said ring for focusing the beam of light passing through said film at a point outside of said objective and on said line between said objective and said mirrors, and an apertured reflector arranged angularly to said line with the aperture of said reflector substantially at said point.

13. In mechanism of the character described, the combination with a continuously movable film, of means for reflecting a beam of light passing through said film back on itself toward a constant position independent of the movement of said film, and an apertured mirror angularly arranged in the path of said reflected beam for diverting said reflected beam out of said machine without interfering with the passage of the beam to said reflecting means.

14. In mechanism of the character described, means for reflecting an incident beam of light with the axis of the reflected beam substantially coincident with the axis of said incident beam, and means for diverting said reflected beam without interfering with said incident beam comprising an apertured reflector arranged angularly with respect to the axis of said beam.

15. In mechanism of the character described, means for projecting a moving beam of light, a series of revoluble mirrors for rendering said beam stationary and for reflecting said beam back on itself, and an apertured reflector arranged angularly with respect to the axis of said beam for allowing said moving beam to pass therethrough on to said mirrors, and for diverting the beam reflected back on itself away from said axis.

16. In mechanism of the character described, the combination with a movable film, of means for passing a beam of light through said film, and revoluble means synchronized with the movement of said film for reflecting said beam with the axis of the reflected beam substantially coincident with the axis of said beam before reflection.

17. The combination with a movable film of an internally reflecting series of mirrors arranged in the form of a polygonal prism and rotated in synchronism with the movement of said film, means for projecting light through a predetermined length of moving film on to said mirrors substantially at right angles to the operative mirrors, and means for diverting the beam of light reflected from said mirrors out of said prism.

18. Means for diverting a beam of light reflected back on itself comprising an apertured reflector arranged angularly with respect to the axis of said beam, and means on said reflector for compensating for the loss of light due to the aperture in said reflector.

Signed at the city of New York, in the county of New York, and State of New York, this 28th day of April, 1923.

ISRAEL N. STEIGMAN.